United States Patent

Häberle et al.

[11] 3,880,454
[45] Apr. 29, 1975

[54] BUMPER FOR VEHICLES, ESPECIALLY MOTOR VEHICLE

[75] Inventors: Fritz Häberle; Daniel Riechers, both of Sindelfingen, Germany

[73] Assignee: Daimler-Benz Aktiengesellschaft, Stuttgart, Germany

[22] Filed: Nov. 6, 1972

[21] Appl. No.: 304,051

[30] Foreign Application Priority Data
Nov. 5, 1971 Germany............................ 2155018

[52] U.S. Cl................. 293/71 R; 293/89; 267/140
[51] Int. Cl.............................................. B60r 19/08
[58] Field of Search ........... 293/71 R, 71 P, 88, 89, 293/99, 1; 267/140

[56] References Cited
UNITED STATES PATENTS
3,418,815  12/1968  Kumazawa..................... 267/140
3,574,379   4/1971  Jordan .............................. 293/71 R
3,606,434   9/1971  Barton et al. .................... 293/71 R
3,666,310   5/1972  Burgess et al. .................. 293/71 R
3,669,484   6/1972  Bernitz ............................. 293/71 R Primary Examiner—James B. Marbert
Assistant Examiner—Robert Saifer
Attorney, Agent, or Firm—Craig & Antonelli

[57] ABSTRACT

A bumper intended for vehicles, especially for motor vehicles, which comprises a rigid back wall and an impact-distributing device arranged in front of the rigid back wall and embedded in a foamed material provided with an outer cover; the impact-distributing device is thereby constructed as flat profile, in particular of spring steel, which—adapted to the curvature of the bumper—extends up to the end areas of the angularly bent end portions of the bumper.

13 Claims, 3 Drawing Figures

3,880,454
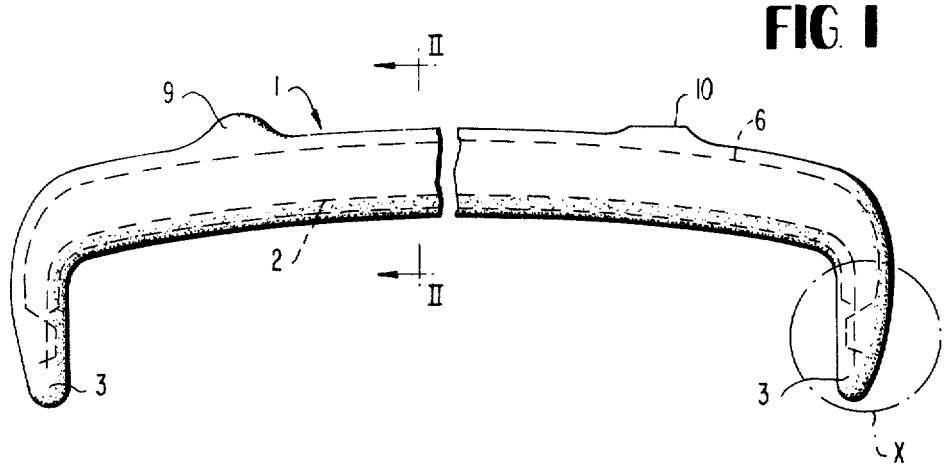
FIG. 1
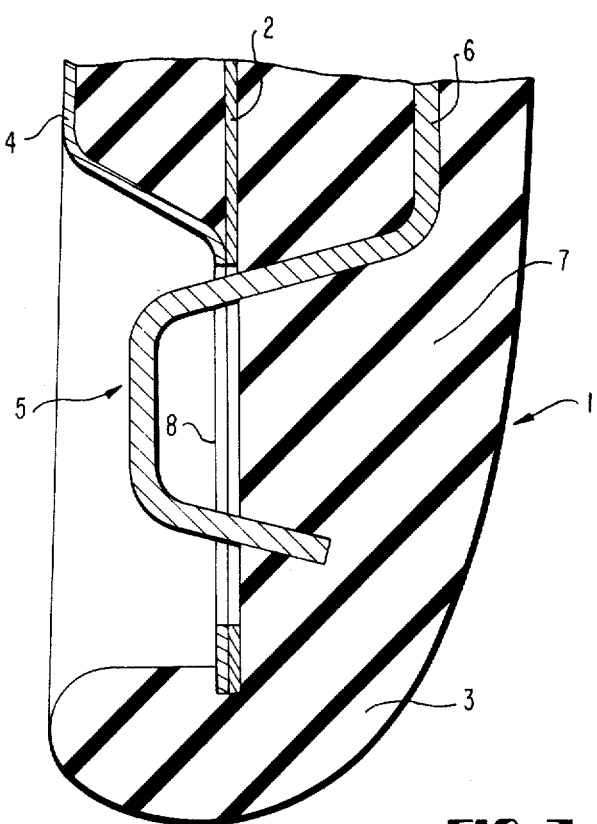
FIG. 2
FIG. 3

BUMPER FOR VEHICLES, ESPECIALLY MOTOR VEHICLE

The present invention relates to a bumper intended for vehicles, especially for motor vehicles, which includes a rigid back wall and an impact distributing device arranged in front of the rigid back wall and embedded in a foamed material provided with an outer cover.

Such a bumper is already described in the German Offenlegungsschrift No. 1,802,310 whereby the impact distributing device is constructed as hose-like chamber which extends essentially between the two support arms and is filled with an incompressible fluid. This prior art construction entails the disadvantage that by reason of the required impermeability of the chamber in case of an impact, the walls thereof have to consist of relatively strong material whereby the aimed-at goal of a damping effect by controlled plastic deformation cannot be completely attained. Furthermore, it is disadvantageous with this prior art construction that by reason of the parabolically shaped cross-sectional form of the elastomer body, the bumper readily tilts in the upward or downward direction in case of an impact against an obstacle and therefore no longer is able to fulfill its function.

It is the aim of the present invention to provide a bumper of the aforementioned type which does not entail the described disadvantages and which, in particular, is able to absorb also laterally impinging impacts.

Accordingly, a bumper intended for vehicles, especially for motor vehicles, is proposed which includes a rigid back wall, in front of which is arranged an impact distributing device embedded in a foamed material provided with an outer cover, whereby according to the present invention, the impact-distributing device is constructed as flat profile consisting, in particular, of spring steel which—adapted to the curvature of the bumper—extends up to the end area of the bent-off end portions of the bumper.

According to a further feature of the present invention, the rigid back wall is provided with a box-shaped reinforcement terminating at the end portions and is connected with fixed vehicle parts under interposition of rigid or elastic means.

A high tilting and twisting-stability is achieved if the back wall and the running-out part of the reinforcement are provided with apertures, within which the ends of the flat profile, which are angularly bent several times, are guided in a manner safe against tilting.

Furthermore, the bumper may be provided with horns or bumper guards projecting forwardly out of the foamed material and consisting of the latter.

However, the bumper may also be provided at its front face with mounting surfaces for bumper horns or bumper guards.

Accordingly, it is an object of the present invention to provide a bumper for vehicles, especially for motor vehicles which avoids by simple means the aforementioned shortcomings and drawbacks encountered in the prior art.

Another object of the present invention resides in a bumper for vehicles which is capable of absorbing also laterally impinging impacts while at the same time assuring a satisfactory damping effect.

A further object of the present invention resides in a bumper for vehicles, especially for motor vehicles, which obviates the need for particularly strong-walled materials to accommodate an incompressible fluid.

Still another object of the present invention resides in a bumper of the type described above which not only operates reliably under all conditions but permits the realization of a high degree of stability against tilting and twisting in case of impact.

These and further objects, features and advantages of the present invention will become more apparent from the following description when taken in connection with the accompanying drawing which shows, for purposes of illustration only, one embodiment in accordance with the present invention, and wherein:

FIG. 1 is a plan view of a bumper in accordance with the present invention;

FIG. 2 is a cross sectional view taken along line II—II of FIG. 1; and

FIG. 3 is a partial cross-sectional view, on an enlarged scale, illustrating the end portion of the bumper within the area encircled in FIG. 1 in dash and dot lines and designated by reference character X.

Referring now to the drawing wherein like reference numerals are used throughout the various views to designate like parts, a bumper generally designated by reference numeral 1 which is connected by rigid or elastic means of any conventional type (not shown) with fixed vehicle parts, includes a rigid back wall 2 which receives a further reinforcement by a box-like strengthening or reinforcing member 4 running out at the bent-off end portions 3 of the bumper 1. An impact-distributing device generally designated by reference numeral 5 is constituted by a flat profile member 6, consists of spring steel and is embedded in a foamed material 7 of any conventional type, such as a foamed synthetic resinous material. The flat profile 6 extends, adapting itself to the curvature of the bumper 1, up to the end area of the bent-off end portions 3. The impact-distributing device 5 is bent off several times within the end area and is guided in a tilt-proof manner within apertures 8 (FIG. 3) which are provided in the back wall 2 and in the running-out portions of the reinforcement 4.

As can be seen from the left half of FIG. 1, the bumper 1 may be provided with horns or bumper guards 9 which consist of the foamed material and form an integral unit therewith. However, as illustrated in the right-half of FIG. 1, also mounting surfaces 10 for the horns or bumper guards may be provided which may be connected with the bumper 1, for example, by gluing, bonding or the like.

In case of an impact of the bumper 1 against an obstacle whereby the impact action can also take place obliquely to the driving direction, the installation maintains its stability and a distribution of the impact forces takes place up to within the end portions 3.

It is advantageous to realize the mounting of the bumper 1 at fixed vehicle parts, for example, at vehicle longitudinal bearers, under interposition of shock- or impact-absorbing means of any conventional, known type which enter into action when the absorption capability of the bumper 1 is exhausted. Also, larger forces can thus be absorbed without impairing the regenerability of the bumper 1.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A bumper having a predetermined curvature, for vehicles, especially for motor vehicles, which bumper is adapted to be horizontally disposed on the motor vehicle and span the width thereof, the bumper comprising: a rigid back wall means, an impact-distributing means arranged in front of said back wall means and embedded in a foamed material provided with an outer cover means, said impact-distributing means being constructed as a flat profile member conforming to the curvature of the bumper and extending up to the end area of the end portions of the bumper, said profile member including bent end portions, means for reinforcing said back wall means including running out portions, and means provided at said running out portions and said back wall means for guiding said bent end portions to prevent tilting of said profile member.

2. A bumper according to claim 1, wherein said end portions of the bumper are angularly bent off within the end areas.

3. A bumper according to claim 2, wherein said flat profile member consists of spring steel.

4. A bumper according to claim 3, wherein said reinforcing means includes a box-shaped member terminating in the area of the end portions.

5. A bumper, having a predetermined curvature and bent away end portions, for vehicles, especially motor vehicles, comprising: a rigid back wall means, an impact-distributing means arranged in front of said back wall means and embedded in a foamed material provided with an outer cover means, said impact-distributing means being constructed as a flat profile member of spring steel conforming to the curvature of the bumper and extending up to the end area of the bent away end portions, said profile member being provided with angularly bent end portions, a box-shaped reinforcing means provided on said rigid back wall means terminating in the area of the end portions, said reinforcing means being provided with running out portions, said back wall means and said running out portions being provided with apertures in which the angularly bent ends of said flat profile member are guided to prevent tilting of said profile member.

6. A bumper according to claim 5, wherein said ends of said flat profile member are angularly bent off several times.

7. A bumper according to claim 6, wherein the bumper is provided with bumper guards consisting of foamed material, said bumper guards projecting forwardly out of said foamed material embedding said flat profile member.

8. A bumper according to claim 6, wherein bumper is provided at its front face with mounting surfaces for bumper guards.

9. A bumper according to claim 1, wherein said reinforcing means includes a box-shaped reinforcing member terminating in the area of the end portions.

10. A bumper, having a predetermined curvature, for vehicles, especially motor vehicles, comprising: a rigid back wall means, an impact-distributing means arranged in front of said back wall means and embedded in a foamed material provided with an outer covering means, said impact means being constructed as a flat profile member conforming to the curvature of the bumper and extending up to the end areas of the end portions of the bumper, said profile member being provided with angularly bent end portions, said back wall means being provided with a box-shaped reinforcing means terminating in the area of the end portions of the bumper, said reinforcing means being provided with running out portions, said back wall means and said running out portions being provided with apertures in which said angularly bent end portions of said flat profile member are guided to prevent tilting of said profile member.

11. A bumper according to claim 10, wherein said ends of said flat profile member are angularly bent off several times.

12. A bumper according to claim 1, wherein the bumper is provided with bumper guards consisting of foamed material, said bumper guards projecting forwardly out of said foamed material embedding said profile member.

13. A bumper according to claim 1, wherein bumper is provided at its front face with mounting surfaces for bumper guards.

* * * * *